United States Patent

Le et al.

Patent Number: 5,820,740
Date of Patent: Oct. 13, 1998

[54] HIGH-ABSORPTANCE HIGH-EMITTANCE ANODIC COATING

[75] Inventors: Huong Giang Le, Fountain Valley, Calif.; John L. Chesterfield, Indianapolis, Ind.

[73] Assignees: Aluminum Finishing Corporation, Indianapolis, Ind.; McDonnell Douglas Corporation, Huntington Beach, Calif.

[21] Appl. No.: 890,171

[22] Filed: Jul. 9, 1997

Related U.S. Application Data

[62] Division of Ser. No. 615,994, Mar. 18, 1996.

[51] Int. Cl.$^6$ .............................. C25D 5/00; C25D 11/12; C25D 5/34; C25D 11/06
[52] U.S. Cl. ........................ 205/171; 205/174; 205/175; 205/210; 205/213; 205/229; 205/324; 205/328; 205/330; 205/331; 205/332; 205/333
[58] Field of Search ...................................... 205/171, 174, 205/175, 210, 213, 229, 324, 328, 330, 331, 332, 333

[56] References Cited

U.S. PATENT DOCUMENTS

| | | | |
|---|---|---|---|
| 4,310,586 | 1/1982 | Sheasby et al. | 428/220 |
| 4,397,716 | 8/1983 | Gilliland et al. | 204/33 |
| 4,511,614 | 4/1985 | Greeson et al. | 428/141 |
| 4,647,347 | 3/1987 | Schoener et al. | 204/37.6 |
| 4,648,911 | 3/1987 | Grüninger | 148/6.27 |
| 5,296,285 | 3/1994 | Babel et al. | 428/213 |
| 5,327,600 | 7/1994 | Le et al. | 205/328 |
| 5,472,788 | 12/1995 | Benitez-Garriga | 428/472.2 |
| 5,478,415 | 12/1995 | Massad et al. | 148/272 |

FOREIGN PATENT DOCUMENTS

| 56-166396 | 12/1981 | Japan . |
|---|---|---|
| S56-166396 | 12/1981 | Japan . |

OTHER PUBLICATIONS

Kalantary et al., "Sealing of Electrolytically Formed Porous Films of Aluminum by Nickel Fluoride Process", Plat. Surf. Finish., 80(12), pp. 52–56. Abstract Only., Dec. 1993.

*Primary Examiner*—Kathryn L. Gorgos
*Assistant Examiner*—Edna Wong
*Attorney, Agent, or Firm*—Bell Seltzer Intellectual Property Law Group of Alston & Bird LLP

[57] ABSTRACT

A colored anodic coating for use on surfaces of substrates, e.g. aluminum substrates in which it is desirable to maintain a high solar absorptance (a) and a high infrared emittance (e), particularly in low earth orbit space environments. This anodic coating is preferably a dark colored coating, and even more preferably a black coating. This coating allows a touch temperature within an acceptable design range to preclude burning of an astronaut in case of contact, but also allows a solar radiation absorption in an amount such that an a/e ratio of unity is achieved. The coating of the invention comprises a first layer in the form of an acid anodized colored anodic layer for achieving a high solar absorptance and a second or high emittance layer in the form of a clear acid anodized layer for achieving a high emittance. The entire coating is quite thin, e.g. 1–2 mils and is quite stable in a hostile space environment of the type encountered in a low earth orbit. The coating is obtained by first creating the high emittance clear anodized coating on the metal surface followed by anodizing using a colored anodizing process.

18 Claims, 1 Drawing Sheet

HIGH-ABSORPTANCE HIGH-EMITTANCE ANODIC COATING

This application is a division of application Ser. No. 08/615,994, filed Mar. 18, 1996 pending.

GOVERNMENT RIGHTS

The invention described herein was made in the performance of work under NASA contract NAS9-182000 and is subject to the provisions of Section 305 of the National Aeronautics and Space Act of 1958 (42 U.S.C. 2457).

BACKGROUND OF THE INVENTION

1. Field of the Invention

This invention relates in general to certain new and useful improvements in thermal control surfaces for use on substrates subjected to outer space environment, and more particularly, to substrates having a thermal control surface which enables a high absorption of solar radiation along with a high emission of heat in order to obtain an absorption to emission ratio of approximate unity.

2. Brief Description of the Related Art

In space environments, there is no atmosphere used for conducting heat away from a spacecraft or for that matter in conducting heat to a spacecraft. Therefore, any heat gain or heat loss in an object in a outer space environment must be achieved by radiation. Moreover, the use of solar radiation for purposes of heating, and even more importantly for removing heat from a spacecraft is accomplished through the use of thermal control coatings on a surface of an object. In this way, the thermal control surface can absorb certain solar radiation or otherwise emit or radiate outwardly certain radiation to the space environment.

Thermal control coatings can be formulated and applied in such a manner so as to a have desirable value for solar absorptance (a) and a desirable value for infrared radiation emittance (e). In many cases, it is important to maintain a touch temperature within an allowable design range such that touching of the surface by an astronaut will not cause bodily injury. This is particularly true in the case of micrometeoroid shields. Thus, these micrometeoroid shields require a coating which absorbs as much solar radiation as possible while radiating as much heat away from the substrate as possible to the space environment such that an a/e ratio of unity is achieved.

The solar absorptance properties and the infrared emittance properties of any thermal control coating must also be stable in order to maintain the temperature of the spacecraft in a range required for effective operation. However, for spacecraft which are in an orbit near the earth, (commonly referred to as the "low-earth orbit" or "LEO") these spacecraft experience a very hostile space environment. In the low-earth orbit, the spacecraft or other object is consistently bombarded by atomic oxygen, ultra-violet radiation, charged particles, and for that matter, they are degraded by contamination from other spacecraft components. It has been well established that these factors will degrade the optical properties of a spacecraft thermal control surface fairly quickly in a low earth orbit space environment.

Because of the above problems, there has been a need for a suitable long-life thermal control coating for longevity of any spacecraft structure. Moreover, the coating must be at least moderately economical to produce and easy and economic to apply to or form on a spacecraft structure and it must be easy to handle. Heretofore, there have been attempts to use various types of organic and inorganic black paints to provide the desired optical properties. However, these black paints typically are attacked in the low-earth orbit by those mentioned above and hence, the optical properties very quickly degrade and the paints erode in this environment.

Anodic coatings of aluminum are a very attractive type for a thermal control coating because of the light weight of the anodic coating. Moreover, an anodic coating is integral with the aluminum substrate. Furthermore, the anodic coating does not spall or chip, even when impacted by micrometeoroid debris. In addition, an anodic coating is completely resistant to erosion from atomic oxygen. However, one of the serious deficiencies with the acid formed anodic coatings on an aluminum substrate is the very substantial increase in the solar absorptance by the coated substrate without the concomitant infra-red radiation emission, thus raising the temperature of the control surface to an unacceptable level in the low-earth orbit space environments.

A thermal control coating of the type having a high absorptance so that it is capable of absorbing heat, such as solar heat, in a dark side of an orbit and a high emissivity for radiating the heat on the exposed side of an orbit would be highly desirable. There is presently no known coating which is capable of actually providing an absorptance to emission ratio of 1 and which is still stable in a space environment, although that is the desired goal. Thus, there is a need for a component which would maintain a relatively constant temperature controlled to have at least sufficient heat for operation and comfort to an astronaut but not excessive heat which would cause burning of an astronaut in a low earth orbit environment.

OBJECTS OF THE INVENTION

It is therefore, one of the primary objects of the present invention to provide a thermal control coating for use on a substrate to maintain a high solar energy absorptance and a high infrared emittance in order to maintain a desired temperature of the substrate.

It is another object of the present invention to provide a thermal control coating of the type stated which can absorb a substantial amount of solar radiation and which can also radiate as much heat as possible to the surrounding ambient environment in order to achieve an absorptance to emission ratio of approximate unity.

It is a further object of the present invention to provide a thermal control coating of the type stated which can maintain a desired temperature of a substrate in a space environment, but which is also stable and capable of withstanding the deleterious effects of a space environment.

It is an additional object of the present invention to provide a thermal control coating of the type stated which effectively increases the longevity of a substrate to which the coating is applied.

It is yet another object of the present invention to provide an anodized coating on an aluminum substrate which includes a clear anodized layer and an integral color anodized layer.

It is also an object of the present invention to provide a thermal control coating of the type stated which is economical to produce and also which is relatively easy to apply to a substrate and which does not spall or chip when contacted by debris in a space environment.

It is a salient object of the present invention to provide a component for use in an outer space low earth orbit environment and which has an approximate absorptance to emission ratio of unity.

It is still another salient object of the present invention to provide a method of applying a highly effective thermal control coating to a substrate in order to achieve a high solar absorptance and a high infrared emittance.

With the above and other objects in view, our invention resides in the novel features of form, construction, arrangement and combination of parts and components presently described and pointed out in the claims.

BRIEF SUMMARY OF THE INVENTION

The present invention relates to the provision of a thermal control coating for use on substrates in an environment where solar radiation can be absorbed for achieving a high solar radiation absorption but with a high infrared emittance. The thermal control coating of the invention is highly effective for use on substrates which are subjected to a rather hostile environment in low-earth orbit space.

The thermal control coating of the invention relies on the combination of a high emittance clear acid anodized coating layer and an integral color anodized coating layer which in combination enables achievement of a high solar absorptance and a high infrared emittance. The thermal control coating of the invention is relatively thin and typically is formed in the range of about one mil to about two mils of thickness and preferably about one mil thick. Furthermore, it is relatively light in weight compared with a standard layer of black paint which has been used in the prior art. The thermal control coating of the invention also provides highly stable optical properties even when subjected to the harsh environment of a low-earth orbit.

The use of a clear anodic coating layer and an integral color anodic layer coating is highly effective in combination inasmuch as the two in combination can provide an absorption to emittance ratio of unity and importantly avoids the need for a separate organic or inorganic black material application. Previously, in order to obtain absorptance, a black ceramic paint was often applied to the substrate surface. However, the black paint presented many disadvantages. The combination of the clear anodic coating layer and the integral colored anodic layer in the coating is effective and would not have been anticipated to be highly resistant to the degradating components in a low-earth orbit and still provide an absorption to emittance ratio of about unity.

The thermal control coating of the invention is achieved by first preparing a control surface of the substrate, as hereinafter described. After preparing the surface, the method involves the creating of the high emittance clear anodized coating layer on the control surface, as for example, the surface of a metal substrate, i.e. an aluminum substrate by an anodizing process. Thereafter, anodizing further is accomplished using an integral color anodic coating process, such as, for example, the so-called "Duranodic" anodizing process. This results in a component having a control coating with an integral color anodized inner layer and a clear anodized outer layer.

The integral color coating layer of the present invention is preferably a dark colored coating layer and even more preferably, a gray or black coating layer. The color primarily serves the function of improving the absorptance of solar energy. However, in connection with the present invention, the black anodized layer has been found to be effective along with a clear anodized layer in attempting to approach an absorptance to emission ratio of one.

The substrate on which the thermal control coating is employed is aluminum or an aluminum alloy. The clear anodized coating layer is formed by immersing the aluminum or other component in an anodizing bath, such as a sulfuric acid anodizing bath and anodizing with an applied voltage of about 10 to 24 volts and an amperage of about 19 amperes per square foot. Thereafter, the component is rinsed in tap water at room temperature and introduced into an integral color anodizing bath, such as the bath used in the so-called Duranodic process.

The integral color anodizing process is conducted at a temperature of about 70° F., but within a range of 65° F. to about 75° F. and with a voltage of up to 90 volts D.C. for up to 60 minutes. The color which is imparted to the integral color layer is determined by several factors. The integral color coating layer essentially will have a color which is dependent upon both the voltage and the current which is applied and the alloy and temper of the metal being anodized. The control of the voltage primarily will affect the color whereas the control of the current will primarily affect the thickness of the coating layer.

The color which is imparted to the integral color layer is also a function of the particular aluminum which is used. In this case, 5000, 6000, or 7000 series aluminum alloys can be used to produce the black duranodic coating layer.

The electrolyte used in the integral color anodizing process is generally an electrically resistant electrolyte and accordingly, small amounts of an electrically conductive acid, such as sulfuric acid, is added to the electrolyte.

After removal from the integral color bath, the component is then introduced into a hot water bath or other suitable bath for a period of time in order to seal the surface thereof. This sealing does not affect the emittance or absorptance, but does improve corrosion resistance.

As indicated previously, preparation of the sample first takes place in steps. These preparation steps generally include a cleaning in an alkaline cleaning bath or an acid detergent for a relatively short period of time and thereafter rinsed. After the rinsing of the component, it may then be introduced into an etching solution and in many cases, dual stage etching solutions are employed. Thus, in a preferred embodiment the sample, after being detergent cleaned, is introduced first into an acid etching bath and then into an alkaline etching bath. Frequently, a water rinsing in tap water will occur between the acid etching bath and the alkaline etching bath. The etching baths are used to literally etch the surface of the aluminum to better prepare the same for a subsequent anodizing and to also clean and further form a smooth outer surface.

The thermal control coating of the present invention and the substrates using such thermal control coatings, as well as the method of making and using the same, have other purposes which will be made more clearly apparent from a consideration of the forms in which they may be embodied. These coatings and the substrates utilizing the coatings, as well as the method therefore will now be illustrated in the accompanying drawings and described in detail for purposes of setting forth the general principles of the invention, although it is to be understood that the following detailed description and the accompanying drawings are not to be taken in a limiting sense.

BRIEF DESCRIPTION OF THE DRAWINGS

Figure 1:
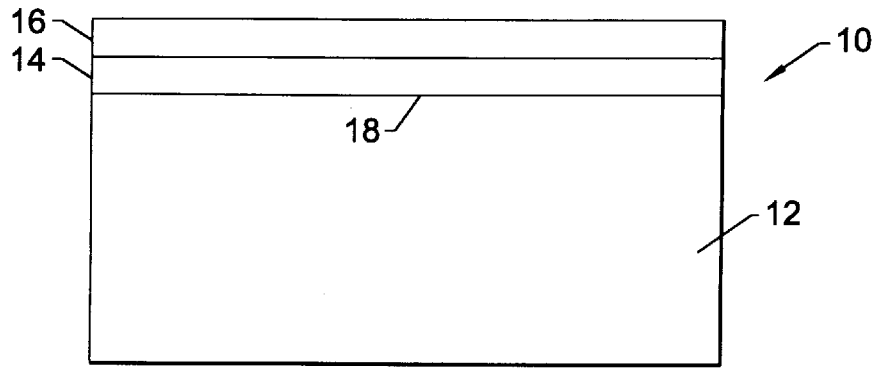
Figure 2:
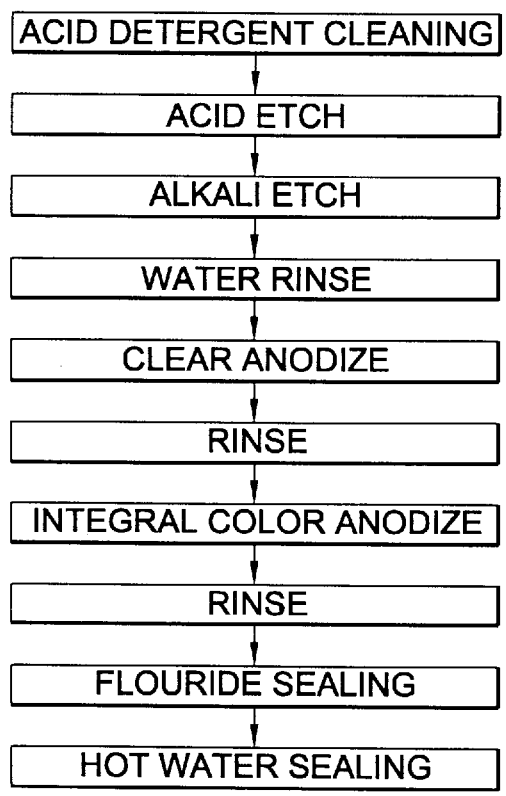

Having thus described the invention in general terms, reference will now be made to the accompanying drawing in which:

FIG. 1 is a schematic view showing a substrate with a thermal control coating thereon in accordance with the present invention; and FIG. 2 is a schematic block diagram showing the major steps in the method of producing the thermal control coating of the present invention.

DETAILED DESCRIPTION OF A PREFERRED EMBODIMENTS OF THE INVENTION

The present invention provides a unique thermal control coating 10 on a substrate, such as an aluminum substrate 12 as shown in FIG. 1 of the drawings. The thermal control coating 10 is comprised of a first or inner layer 14 in the form of a colored anodic coating layer and a second or outer layer 16 in the form of a transparent or clear anodized coating layer and with a thin barrier layer existing between the substrate 12 and the inner layer 14.

Each of the layers 14 and 16 have approximately the same thickness. Each of the layers thicknesses will range between 0.5 mils (5/10,000 inch) to about 2 mils (2/1,000 inch). However, each layer will have an average thickness of about 0.7 mils to about 1.1 mil and preferably about 0.8 mils to about 0.9 mils. The overall thickness of the layers 14 and 16 is to some extent based on the anodizing conditions and particularly the anodizing current density and the time in which the substrate remains in the anodizing bath forming the clear anodized layer 16 and the anodizing bath forming the integral color anodized layer 14.

The outer layer 16 is actually the first applied layer but becomes the outer layer due to the fact that the coating actually forms at the substrate surface.

As indicated previously, the integral color layer 14 can be formed of any dark color and preferably is gray or black. To some extent, the thickness of the integral color layer 14 is used to control the amount of radiated solar energy. Normally, the emittance of solar radiation with standard aluminum oxide is approximately 0.78. With the thermal control coating of the present invention, it is possible to obtain a radiation or emittance of about 0.9 or approximately ninety percent (90%). When in combination, however, the thermal control coating will emit about eighty percent (80%) of the solar radiation and absorb about eighty percent (80%) of the solar radiation to approximate an absorptance to emittance ratio of about one.

The outer surface of the substrate 12, before anodizing, effectively constitutes the thermal control surface 18. Prior to forming either of the layers 14 or 16, the surface of the substrate 12, on which the thermal control coating 10 is to be formed, is cleaned, as for example, in an alkaline cleaner of pH 10 to 14 or otherwise an acid cleaner of pH of about 5.0 and typically with a detergent. Any conventional detergent solution can be used for purposes of cleaning.

The cleaned control surface is then etched in either an acid etch or an alkaline etch. In one of the preferred embodiments of the present invention, both an acid etch and an alkaline etch are employed. Thus, the component is introduced into an acid etching solution followed by introduction into an alkaline etching solution. The component is allowed to remain in the etching solution from about one to five minutes and which solution is maintained at roughly about 120° F. Any known etching solution may be used for this purpose.

Upon removal from the alkaline etching solution, the component is then water rinsed again for about two to five minutes at room temperature with conventional tap water. In this way, all cleaning components, or etching components are effectively removed before commencement of any of the anodizing processes.

The outer layer 16 constituting the clear anodized layer is initially formed by introducing the component in the anodize bath, which is preferably a sulfuric acid anodize bath. The sulfuric acid is present in the clear anodize electrolyte in an amount of about fifteen percent (15%) by weight to about twenty percent (20%) by weight. Other acid anodizing substances which are known in the art may also be used.

The clear anodizing process is a stepwise anodizing process such that the current is varied over a period of time in the anodizing bath. The voltage is initially maintained at about 12 to about 22 volts and the bath is maintained at room temperature of roughly about 75° F. The current density initially is established at a certain level and is decreased over time. Initially, the current density is established at 19 amperes per square foot for about twenty minutes. Thereafter, the current density is reduced to about 15 amperes per square foot for twenty minutes and finally to about 10 amperes per square foot for twenty minutes such that the clear anodizing process takes about sixty minutes. Typically, the voltage is regulated in order to obtain the desired current density.

The varying of the voltage in the manner as previously described, provides a non-uniform coating. Typically, it has been found that there are effectively three distinct microstructures formed in the clear anodized layer itself when the stepwise voltage is applied. This clear anodized coating thus formed with these distinct microstructures appears to provide enhanced emissivity of the infrared radiation.

As indicated previously, the electrolyte employed in the clear anodize process is sulfuric acid. The acid may also include additives such as glycerin or glycolic acid to enhance the surface finish thereof. The amount of the finish enhancing additives, such as glycerin or glycolic acid, is preferably present in an amount of about three percent by weight, although this amount can vary between about one percent by weight to about four percent by weight. Other additives known for this purpose may be employed to enhance the finish.

After removal from the clear anodize electrolyte, the substrate is then rinsed in tap water for a few minutes at room temperature. The substrate is then introduced into an integral color acid bath in order to form the integral color layer, such as a black or gray integral color layer, forming part of as the coating thereon. The electrolyte employed in the integral color anodizing process is a sulfonated hydrocarbon and preferably a sulfonated straight chain hydrocarbon acid of roughly two to eight carbon atoms, as for example, 4-sulfophthalic acid with a strength of roughly sixty five to seventy grams per liter. The acid strength can vary between about 60 grams per liter to about 90 grams per liter. However, any sulfonated acid may be employed as for example, sulfosalicylic acid.

The term "integral color" with respect to anodizing represents that anodizing process in which color becomes integral in the anodize layer during the anodizing process. In this way, there is no need for a second step in which color is added, as for example, by a black paint pigment or, a dying process. There is also no need for an additional anodizing process with tin or nickel, or cobalt involved. Thus, and as used herein, the term "integral color" will refer to that anodizing process in which the conditions are chosen and the materials are chosen so as to provide a color imparted to the anodized layer during the anodizing process.

There are a number of available integral color anodizing processes. Many of these processes differ primarily in the chemistry of the anodizing bath. Thus, one process which is available is known as "Kalcolor" and uses a 5-sulfosalicylic acid in combination with sulfuric acid as the anodizing bath.

There is also a "Duranodic" integral color anodizing process which uses 4-sulfophthalic acid along with sulfuric acid. In addition, other integral color anodizing processes are also known and include, for example, the European "Tego" process.

The integral color anodizing process takes place at about room temperature, approximately 70° F. The temperature in the integral color anodizing bath is usually maintained within a range of about 60° to about 80° F. and preferably within a range of about 65° to about 75° F. The voltage is maintained at a level of about 90 volts for a period of approximately sixty minutes. The anodizing time may vary up to 60 minutes depending on the alloy, temper and physical part size and configuration.

The voltage can range from about 75 volts to about 100 volts and preferably is held within about 85 to 95 volts. The color produced is in large measure a function of the voltage, as well as other factors. However, current is usually a function of the surface area and the desired thickness of the coating layer. Usually, and in order to obtain a layer of somewhat less than 1.0 mil, the current density is maintained between 24 to 48 amperes per square foot initially.

One of the preferred integral color anodizing processes is the Duranodic process, although the invention is not so limited and other integral color processes can be employed. As indicated previously, a sulphonated hydrocarbon acid is preferred. However, the sulphonated hydrocarbons are often electrically resistant and therefore a small amount of an electrically conductive compound, such as sulfuric acid, is added. The sulfuric acid is only added in a minor amount merely sufficient to render electrical conductivity to the electrolyte. Thus, the sulfuric acid is added in an amount of about one percent to about five percent by weight.

The colors which are generally produced for the integral color anodized layer are typically black, gray, or gray-black. The colors may also be- brown, brown-gray, brown-black, blue-gray or blue-black and combinations of the foregoing. Generally, the darker colors, such as the gray-black or blue-gray, are preferred for use in the integral color anodized layer.

The exact color which is achieved in accordance with the integral color anodizing process is actually a function largely of the aluminum alloy and temper which is selected. The different alloys and different tempers will yield different colors. Typically, the aluminum alloys which are preferred are of the aluminum 5000 series, the aluminum 6000 series, or the aluminum 7000 series. In conventional aluminum designation, the first four numbers of the designation designates the particular alloy and the second portion of the designation, usually containing an alphabetic letter, represents the temper of the aluminum alloy. In order to achieve a gray or a black color or a gray-black color, the alloy and temper bases of the alloys are preferably 5005-H34, 6061-T6, 6063-T52, 7075-T6, 7075-T73, 7075-T7351 and Alclad 7075-T73.

The 7075-T6 aluminum alloy will produce a blue-gray color and the 7075-T73 alloy will produce a dark blue-gray color. The Alclad 7075-T73 alloy will produce a brown-gray color. Generally, the 6000 series alloys will produce more characteristic brown or black colors.

As indicated previously, color is to some extent also affected by the applied voltage, but generally not the current density. The integral color anodizing process may be started out with a specific voltage and the voltage may increase during the anodizing process. The current, however, may decrease during the process as the impedance increases due to the thickness of the anodized layer being created. If a lower voltage is employed, the color is less dark. Consequently, in order to achieve a blue-gray or gray-black color, the voltage should be maintained at about 90 volts. In a preferred embodiment, and in order to obtain a desired blue-gray color, a voltage of 50 to 90 volts is applied with a current density of about 24–36 amperes per square foot. The current density is then held constant as the voltage increases to a maximum of about 90 volts. The anodizing time can vary up to about 60 minutes.

The integral color layer which is produced is a very hard anodic coating and it has an integral color which is colorfast. Moreover, the layer does not require any separate coloring operation.

After the integral color anodizing, the sample is then introduced into a sealing solution, as for example, a nickel fluoride sealing solution for approximately ten to twenty minutes at between about 80° to 90° F. The substrate should remain in the sealing solution for at least ten minutes and generally no more than twenty minutes. This is followed by a hot deionized water rinse which also serves as a sealant. The sample then may be air dried.

EXAMPLE

The invention is further illustrated by, but not limited to, the following example:

Example 1

A sample of aluminum alloy 7075-T6 clad which is essentially a zinc aluminum alloy was cleaned in a mild acid detergent bath and the acid detergent employed was Benchmark A 1032. Thereafter, the sample or substrate was introduced into a sulfuric acid persulfate pickle as an initial etching solution for about five to ten minutes at room temperature. The sample was then rinsed in tap water at room temperature and then introduced into an etching bath of sodium hydroxide with a strength of about 80 grams per liter. Finally, after etching in sodium hydroxide, the sample was then rinsed in tap water for about two minutes at room temperature and then is desmutted in a sulfuric/persulfate solution followed by rinsing for two minutes in tap water.

The first anodizing step employed was that of a clear anodizing and the anodizing was conducted in a standard sulfuric acid anodizing bath. The bath contained sulfuric acid in a strength of about twenty percent (20%) and also contained about two to three percent (2–3%) glycerin and glycolic acid as finishing additives. A current density of 19 amperes per square foot was applied for approximately twenty minutes and thereafter the current density was reduced to 15 amperes per square foot for about twenty minutes and further reduced again to about 10 amperes per square foot for twenty minutes. The anodizing bath temperature was maintained at 75° F.

After the sample was removed from the clear anodizing bath, it was then rinsed in tap water again for approximately two minutes at room temperature.

The black anodized coating layer was applied by introducing the sample into an integral color anodizing solution for another sixty minutes and at 70° F. In the integral color black anodizing process, the anodizing solution or electrolyte comprised 4-sulfophthalic acid having a strength of about 65 to 70 grams per liter and was maintained at 70° F. A voltage in the amount of 90 volts and having a current density of 19 amperes per square foot was then applied to the sample for one hour.

Upon removal of the sample from the integral color black anodizing tank, the sample did have a very hard black anodic layer. The sample was then introduced into a nickel fluoride sealing tank for approximately twenty minutes at approximately 82° to 85° F. This was followed by introducing the sample into hot deionized water at approximately boiling temperature for about another twenty minutes. The sample was then removed and air dried.

The anodic coating produced had a high infrared emittance of 0.86 and a solar absorptance of 0.86. The thickness of the thermal control coating was 1.7 mils.

Example 2

A sample of an aluminum alloy 7075-T7351 which is a high zinc-aluminum alloy, was subjected to standard cleaning procedures using soap and water and then rinsed in clean water. The sample was then introduced into a deoxidizing bath and then subjected to alkaline etching and desmutting in order to obtain a clean surface thereon. Copious rinsing occurred between each of the cleaning steps.

The sample was then introduced into an anodizing bath of about fifteen to twenty percent sulfuric acid and which contained two to four percent of organic additives, such as glycerin and glycolic acid. The sample was then anodized at a current density of about 19 ampers per square foot for about twenty minutes, and then 15 ampers per square foot for about twenty minutes and 10 ampers per square foot for about twenty minutes while the anodizing bath was maintained at 75° F.

After the sample was removed from the clear anodizing bath, it was then rinsed with tap water and placed in an anodizing electrolyte containing approximately 70 grams per liter of 4-sulfophthalic acid and a small amount of sulfuric acid sufficient to make the bath conductive. Moreover, the temperature was maintained at 70° F.

In the second bath, the sample was anodized at a current density of between 24 to 27 ampers per square foot for twenty minutes. When the sample was removed from the bath, it was again rinsed with copious amounts of tap water and with ionized water. The sample was then sealed at room temperature in a bath of nickel fluoride for about twenty minutes. The sample was then removed and air dried.

The anodic coating produced by this process had a normal coating thickness of about 1.7 mil plus or minus twenty percent. The solar absorptance and the infrared emittance values were determined between 0.86 and 0.92.

Thus, there has been illustrated and described a unique and novel thermal control coating and more particularly, a high-emittance high-absorptance colored anodic coating as well as a method of making the same and which thereby fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what we desire to claim and secure by letters patent is:

1. A method of producing a thermal control coating on a metal substrate having a high solar absorptance and a high infrared emittance, said method comprising:

a) preparing a control surface of a metal sample for anodizing;

b) introducing the prepared sample into a first acid anodizing bath containing an electrolyte;

c) applying current to the sample at a preestablished current density and decreasing the current density over time from the preestablished current density to a final current density to produce a transparent anodized coating layer having high infrared emittance on the control surface of the sample;

d) introducing the sample into a second anodizing bath also containing an electrolyte; and e) applying current to the sample with sufficient current density and sufficient voltage to produce a colored anodized coating layer having high solar absorptance between the transparent anodized coating layer and the control surface of the sample.

2. The method of claim 1 further comprising maintaining the sample in the first acid anodizing bath and in the second anodizing bath for a time sufficient to obtain coating layer thicknesses sufficient to obtain an absorption to emission ratio of about one.

3. The method of claim 1 wherein said preparing step comprises etching the control surface.

4. The method of claim 3 wherein said preparing step further comprises cleaning the control surface in an alkaline or acid bath prior to said etching step.

5. The method of claim 1 wherein said preparing step comprises etching the control surface in an acid etching solution and etching the control surface in an alkaline etching solution.

6. The method of claim 1 further comprising the step of sealing the control surface after producing the colored anodized coating layer.

7. The method of claim 6 wherein said sealing step comprises sealing the control surface in a nickel fluoride solution.

8. The method of claim 1 wherein said second applying step comprises applying sufficient voltage to obtain a black or gray anodized coating layer.

9. The method of claim 1 wherein said second applying step comprises applying current to the sample with sufficient current density and sufficient voltage to produce a dark-colored anodized coating layer.

10. The method of claim 1 wherein said second applying step comprises applying current to the sample with sufficient current density and sufficient voltage to produce an anodized coating layer having a color selected from the group consisting of black, gray, gray-black, brown, brown-gray, brown-black, blue-gray, blue-black, and combinations thereof.

11. The method of claim 1 wherein said first introducing step comprises introducing the prepared sample into an acid anodizing bath comprising sulfuric acid.

12. The method of claim 11 wherein said first introducing step comprises introducing the prepared sample into an acid anodizing bath further comprising glycerin or glycolic acid.

13. The method of claim 1 wherein said second introducing step comprises introducing the sample into a second anodizing bath comprising a sulfonated hydrocarbon acid.

14. The method of claim 13 wherein said second introducing step comprising introducing the sample into a second anodizing bath further comprising sulfuric acid.

15. The method of claim 13 wherein said second introducing step comprises introducing the sample into a second anodizing bath comprising a sulfonated straight chain hydrocarbon acid of between two and eight carbon atoms.

16. The method of claim 13 wherein said second introducing step comprises introducing the sample into a second anodizing bath comprising a sulfonated hydrocarbon selected from the group consisting of sulfophthalic acid and sulfosalicylic acid.

17. The method of claim 1 wherein the first applying step comprises decreasing the current density in a stepwise fashion.

18. A method of producing a thermal control coating on a metal substrate having a high solar absorptance and a high infrared emittance, said method comprising:

a) etching a control surface of an aluminum sample in an alkaline bath, an acid bath, or an acid bath followed by an alkaline bath;

b) introducing the etched sample into a first acid anodizing bath containing an electrolyte;

c) applying current to the sample at a preestablished current density and decreasing the current density over time from the preestablished current density to a final current density to produce a transparent anodized coating layer having high infrared emittance on the control surface of the sample;

d) introducing the sample into a second anodizing bath also comprising a sulfonated hydrocarbon acid; and e) applying current to the sample with sufficient current density and sufficient voltage to produce a dark-colored anodized coating layer having high solar absorptance between the transparent anodized coating layer and the control surface of the sample, the dark-colored anodized coating having a color selected from the group consisting of black, gray, gray-black, brown, brown-gray, brown-black, blue-gray, blue-black, and combinations thereof.

* * * * *